United States Patent
Good et al.

[15] 3,680,438
[45] Aug. 1, 1972

[54] MACHINE TOOL GANTRIES

[72] Inventors: Richard Samuel Jonathan Good, Mountsorrel; Barry Charles Harvey, Kirby Muxloe, both of England

[73] Assignee: Marwin Machine Tools Limited, Anstey, Leicestershire, England

[22] Filed: May 28, 1970

[21] Appl. No.: 41,424

[30] Foreign Application Priority Data

June 24, 1969 Great Britain............31,725/69

[52] U.S. Cl..................90/11 R, 90/15, 408/234
[51] Int. Cl..............................B23c 1/00
[58] Field of Search.......90/11 R, 15, 16, DIG. 2, 38, 90/39, 40, 41, 42; 408/234; 308/3 A

[56] References Cited

UNITED STATES PATENTS 3,559,530  2/1971  Wagner.................90/15 X

FOREIGN PATENTS OR APPLICATIONS 773,319  4/1957  Great Britain..............90/15

*Primary Examiner*—Gil Weidenfeld
*Attorney*—Ralph W. Kalish

[57] ABSTRACT

For use in a machine tool having a fixed bed, a movable gantry comprising first and second side members and a beam. The beam is fixed at one end to said first side member and is adapted for slideable engagement with said second side member whereby the same may be moved relatively with respect to said second side member in a direction perpendicular to the direction of movement of the gantry during machine tool operation.

7 Claims, 1 Drawing Figure

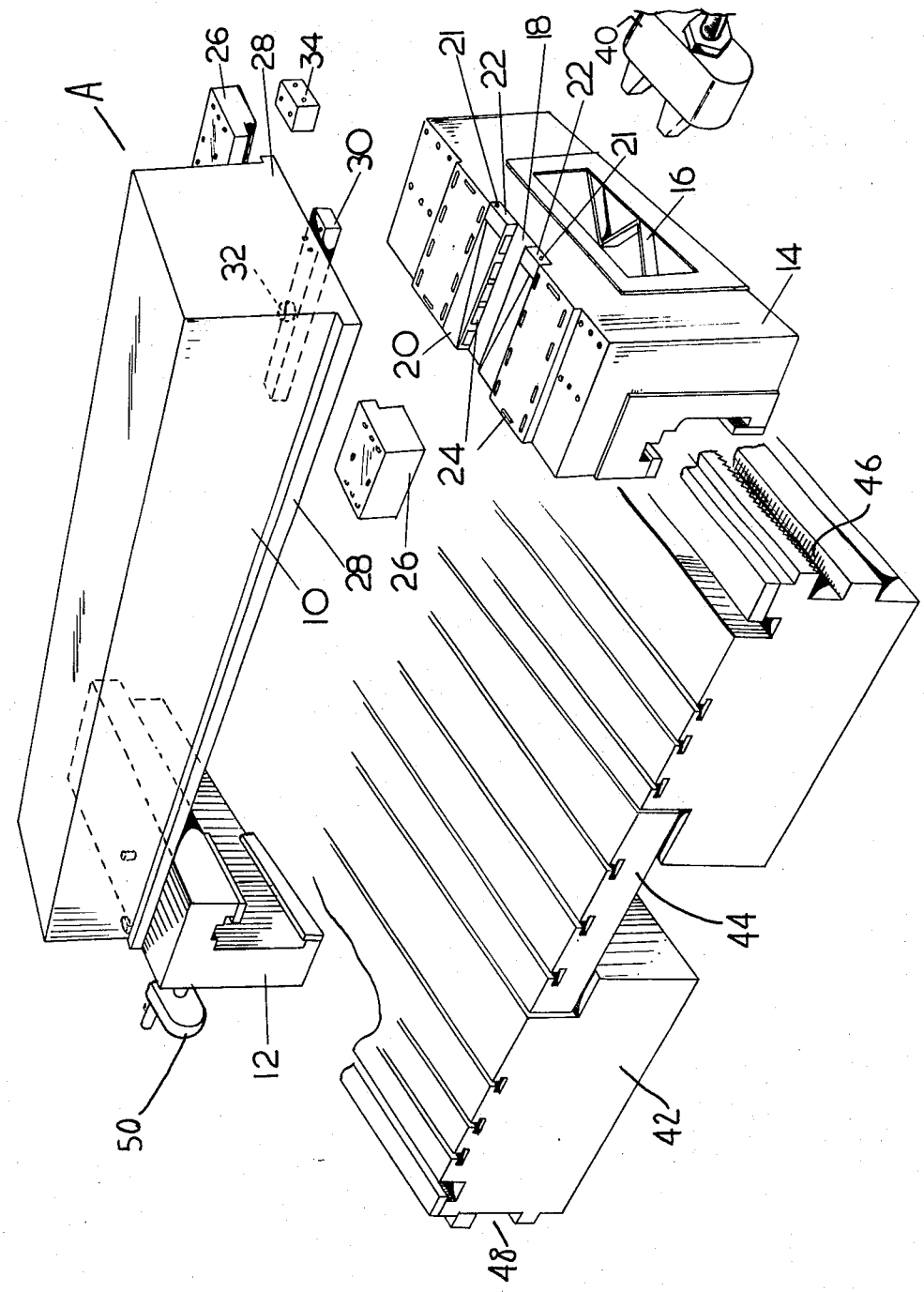

MACHINE TOOL GANTRIES

BACKGROUND AND SUMMARY OF THE INVENTION

The invention relates to machine tools of large size, that is to say of table width greater than about 6 feet, which are useful, for example, for machining aircraft components including the milling and routing of aluminum titanium and/or steel.

The invention provides a machine tool having a fixed bed and a movable gantry, the gantry having drive means between each side member and the bed and a beam fast with one side member and longitudinally slidable in low friction slide ways with respect to the other side member.

The low friction slide ways preferably comprise friction-reducing pads of polytetrafluoroethylene but may alternatively be provided by other low friction material or mechanical means. In order to facilitate mounting, the beam is preferably provided with key on its underside which is receivable in a slot in the adjacent side member. The key is preferably pivotable on the underside of the beam as this facilitates manufacture. The slot on the side member should preferably be provided with taper gibs on the sides which are longitudinally adjustable for final beam alignment. The side member is also preferably provided with beam keeper blocks securable by means of bolts so as to control the movement of the beam. The key preferably extends beyond the end of the beam and is securable in a final position by means of a locking block which can be bolted to the beam and to the key.

The ability of the beam to slide longitudinally on the side member, that is at right angles to the direction of motion of the beam enables expansion to be taken into account while maintaining torsional rigidity.

BRIEF DESCRIPTION OF THE DRAWING

The drawing illustrates a perspective view of a machine tool gantry constructed in accordance with and embodying the present invention, showing the same in partially exploded condition.

DESCRIPTION OF THE PREFERRED EMBODIMENT

The gantry comprises a beam 10 fast with one side member 12 and longitudinally slidable with reference to another side member 14. Side member 14 is provided with a compartment 16 for receiving a conventional gear box 40 of the heavy duty, back-lash loaded type to provide the usual drive means between side member 14 and a fixed bed 42 of the machine tool, indicated generally A. Said bed may be of one-piece construction or may incorporate a false center table 44 for particular width requirements; said bed 42 being also provided on its lateral side faces with longitudinally extending guideways 46,48 for receiving the driving elements (not shown) operatively connected to gear boxes 40 and 50, respectively; said latter being receivable within a compartment (not shown) formed in side member 12, which compartment is in all respects similar to compartment 16. On top of the side member 14 is a slide way 18 which is longitudinal with respect to the beam 10.

The slide way 18 has taper gibs 20 at each side which are longitudinally adjustable by means of bolts 21 passing through blocks 22 which are fast with reference to the ends of the gibs 20. A beam keeper block 26 can be bolted at each end of the side member 14 and has a lip under which a flange 28 of the beam 10 can slide. The gibs 20, on the edges which comprise the sides of the slide way 18, have a number of pads 24 of polytetrafluoroethylene. The top of the side member 14 and the bottom of the lips of the beam keeper blocks 26 are also provided with a number of such pads 24 on which the beam itself can slide. The beam 10 has a key 30 pivotable on its under side by means of a pin 32 receivable in a recess in the beam 10. The key 30 is receivable and longitudinally slidable in the slide way 18. After adjustment the key 30 is made fast with reference to the beam 10 by means of a locking block 34 which is bolted both to the key 30 and to the beam 10 itself.

The gantry shown is assembled by lowering onto the side members with the key 30 entering into the slideway 18. The beam 10 is then made fast by bolting to the side member 12 and the position of the beam 10 with respect to the side member 14 is determined by adjustment of the taper gibs through the bolts 21 in the block 22. Finally longitudinal movement of the beam is facilitated by bolting the beam keeper blocks 26 into position on the side member 14. The gantry can then be operated on the machine tool A in the usual way, moving with respect to the bed 42 into and out of the drawing.

Having thus described our invention, what we claim and desire to obtain Letters Patent for is:

1. A machine tool having a fixed bed and a movable gantry, the gantry having drive means between each side member and the bed and a beam fast with one side member and longitudinally slidable in low friction slide ways with respect to the other side member.

2. A machine tool as defined in claim 1 and further characterized by the low friction slide ways comprising friction-reducing pads of polytetrafluoroethylene.

3. A machine tool as defined in claim 1 and further characterized by the beam being provided with a key on its underside receivable in a slot in the adjacent side member.

4. A machine tool as defined in claim 3 and further characterized by the key being pivotable on the underside of the beam.

5. A machine tool as defined in claim 3 and further characterized by the slot on the side member being provided with taper gibs on the sides, said gibs being longitudinally adjustable for final beam alignment.

6. A machine tool as defined in claim 1 and further characterized by one side member being also provided with beam keeper blocks securable by means of bolts for control of the movement of the beam.

7. A machine tool as defined in claim 3 and further characterized by the key extending beyond the end of the beam and being securable in a final position by means of a locking block, said block being adapted for bolting to the beam and to the key.

* * * * *